(12) United States Patent
Neugebauer et al.

(10) Patent No.: US 8,810,093 B2
(45) Date of Patent: Aug. 19, 2014

(54) ACTUATING DEVICE WITH A CAM DISC, IN PARTICULAR FOR A HEATING ELEMENT VALVE

(75) Inventors: Tobias Neugebauer, Regenstauf (DE); Werner Kaps, Weiler-Simmerberg (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 339 days.

(21) Appl. No.: 13/164,036

(22) Filed: Jun. 20, 2011

(65) Prior Publication Data
US 2011/0309714 A1   Dec. 22, 2011

(30) Foreign Application Priority Data

Jun. 18, 2010   (DE) .......................... 10 2010 024 280

(51) Int. Cl.
*H02K 7/06*   (2006.01)

(52) U.S. Cl.
USPC .......................... 310/80; 310/49.01; 310/68 E

(58) Field of Classification Search
USPC ............. 310/80, 49.01, 68 E, 75 R, 83, 12.14
IPC ................. H02K 7/00,7/06, 7/065, 7/07, 7/075, H02K 7/116
See application file for complete search history.

(56) References Cited

U.S. PATENT DOCUMENTS

| | | | |
|---|---|---|---|
| 3,984,710 A * | 10/1976 | Poel | 310/41 |
| 5,137,051 A | 8/1992 | Laur et al. | |
| 6,732,631 B1 * | 5/2004 | Bitzer et al. | 384/494 |
| 7,047,941 B2 * | 5/2006 | Draper et al. | 123/447 |
| 2007/0210659 A1 * | 9/2007 | Long | 310/80 |

FOREIGN PATENT DOCUMENTS

| | | | |
|---|---|---|---|
| DE | 3642113 A1 | 6/1988 | |
| EP | 1426667 A2 * | 6/2004 | F16K 31/04 |
| EP | 1426667 B1 | 12/2006 | |

OTHER PUBLICATIONS

Machine translation of EP1426667A2 (published Aug. 2003, translated Apr. 2013).*

* cited by examiner

*Primary Examiner* — Michael Andrews
(74) *Attorney, Agent, or Firm* — Laurence A. Greenberg; Werner H. Stemer; Ralph E. Locher

(57) ABSTRACT

An actuating device for a heating element valve has a drive motor with a motor shaft, an actuator, and a rotation-linear conversion drive. The conversion drive is coupled on the drive side to the motor shaft and on the output side to the actuator and converts a rotational movement of the motor shaft into a linear movement of the actuator. The rotation-linear conversion drive further has a cam disc on the output side which is provided on its outer circumferential periphery with a plurality of step segments each having a substantially constant distance from the axis of the cam disc. The step segments are connected via connecting segments with a variable axle spacing.

13 Claims, 4 Drawing Sheets

ACTUATING DEVICE WITH A CAM DISC, IN PARTICULAR FOR A HEATING ELEMENT VALVE

CROSS-REFERENCE TO RELATED APPLICATION

This application claims the priority, under 35 U.S.C. §119, of German patent application DE 10 2010 024 280.2, filed Jun. 18, 2010; the prior application is herewith incorporated by reference in its entirety.

BACKGROUND OF THE INVENTION

Field of the Invention

The present invention relates to an actuating device, in particular an actuating device for a heating element valve.

In order to automatically regulate the heating power, for example of a heating element, heating element valves are known which are actuated by means of an electric-motor-operated or thermostatic drive. Such heating element valves or actuating drives can be used, for example, within the scope of an intelligent energy management system in private households, business premises and the like.

Electric motor-operated actuator drives for heating element valves usually comprise a drive motor, an actuator which acts on the heating element valve and a rotation-linear conversion drive which converts the rotational movement of the motor shaft into a linear movement of the actuator. The rotation-linear conversion drive itself usually comprises a step-down transmission and a conversion element for converting the rotational movement into the linear movement. Furthermore, it is advantageous to use actuator drives with a certain degree of self-locking, with the result that the heating element valve can be held in a desired position which is set at a particular time, without using energy.

U.S. Pat. No. 5,137,051 and its counterpart German published patent application DE 36 42 113 A1 describe an actuating device for a heating element valve with a rotation-linear conversion drive which uses a threaded spindle as a conversion element. The threaded spindle is configured here in a self-locking fashion with an edge angle which is smaller than the acting frictional angle. A known disadvantage of such self-locking spindle drives is the degree of efficiency in the lifting direction of at maximum 50%, which results in increased consumption of energy.

European Patent EP 1 426 667 B1 therefore proposes an actuating device for a heating element valve. That actuating device is advantageous in energetic terms compared to the spindle operation, as described above. For this purpose, a self-locking-free rotation-linear conversion drive is used with, for example, a spiral disc, a toothed segment lever or a helix, which is combined with an additional device for generating periodically modulated braking torques or holding torques. Alternatively, the drive motor itself is equipped with an additional device of this type for generating the braking torques or holding torques. With this actuating device, it is to be possible to achieve an overall efficiency level of over 80%, which allows the energy consumption to be correspondingly reduced compared to the actuating device with self-locking spindle drive.

SUMMARY OF THE INVENTION

It is accordingly an object of the invention to provide an actuating device which overcomes the above-mentioned disadvantages of the heretofore-known devices and methods of this general type and which provides for an improved actuating device with self-locking and low energy consumption, and, in particular, an improved such actuating device for a heating element valve.

With the foregoing and other objects in view there is provided, in accordance with the invention, an actuating device, comprising:

a drive motor with a motor shaft;
an actuator; and
a rotation-linear conversion drive having a drive side coupled to the motor shaft and an output side coupled to the actuator and converting a rotational movement of the motor shaft into a linear movement of the actuator, the output side of the rotation-linear conversion drive including a cam disc having an axis and an outer periphery formed with a plurality of step segments each having a substantially constant spacing distance from the axis of the cam disc and with connecting segments therebetween having a variable spacing distance from the axis of the cam disc.

The actuating device is particularly suitable for a heating element valve. The device comprises a drive motor with a motor shaft, an actuator and a rotation-linear conversion drive which is coupled on the drive side to the motor shaft and on the output side to the actuator and converts a rotational movement of the motor shaft into a linear movement of the actuator. According to the invention, the rotation-linear conversion drive has on the output side a cam disc which is provided on its outer circumferential periphery, simply circumference or periphery in the following, with a plurality of step segments (i.e., constant radius landings) which each have a substantially constant distance from the axis (axle spacing) of the cam disc and are connected via connecting segments with a variable axle spacing.

In contrast to, for example, a self-locking-free spiral disc with an axle spacing, which becomes continuously larger, of the outer circumference, the cam disc of the rotation-linear conversion drive of the actuating device of the invention has self-locking by virtue of the step segments with, in each case, essentially constant axle spacing with respect thereto, since, in order to overcome the connecting segment at least in the direction of the next step with relatively large axle spacing, a relatively large torque has to be overcome. It is possible to dispense with additional devices or a very large step-down transmission ratio in order to generate self-locking in the respective setting positions.

On the other hand, this rotation-linear conversion drive has, compared, for example, to a self-locking threaded spindle, a relatively high efficiency level, as a result of which the overall efficiency level, and therefore the energy consumption, of the actuating device can be significantly reduced.

Basically, any drive motor can be used as the "drive motor." For example, d.c. motors, brushless motors, synchronous motors and piezo-electric motors are suitable as drive motors.

The "rotation-linear conversion drive" serves quite generally for converting the rotational movement of the motor shaft of the drive motor into a linear movement of the actuator. In addition to the specific cam disc, provided according to the invention, for actually converting the rotational movement into the linear movement, the rotation-linear conversion drive usually also comprises—depending on the type of drive motor used—a step-down transmission, with the result that the desired settings can be achieved by the cam disc with a rotation of less than 360°. With the actuating device according to the invention, the step-down transmission can be configured optimally for the torques which occur, since it does not have to bring about any self-locking itself because of the special cam disc.

The term "actuator" is intended to be understood here as a linearly movable element (for example in the form of a plunger) which is driven by the cam disc, and is suitable for acting, for example, on a heating element valve in order to control the heating power.

The "plurality of step segments" of the cam disc comprise at least two step segments, depending on the desired number of possible settings, of a heating element valve, for example. The most frequent numbers for the step segments are in the range from five to twelve step segments, but any other desired numbers are also possible.

The axle spacings of the plurality of step segments usually increase continuously in one rotational direction of the cam disc here, with the result that, when the motor shaft and therefore the cam disc rotates in this one rotational direction, a linear movement of the actuator is generated in just one direction (i.e. there is no to and fro movement).

The "connecting segments" preferably have an axle spacing which changes continuously (i.e. becomes larger or respectively smaller). In order to bring about a certain torque in the other rotational direction with respect to step segments with relatively small axle spacings, it may be advantageous to make the connecting segment with a maximum axle spacing larger than that of the two adjoining step segments.

The "axle spacing" is defined here as the distance between the axis and the radially outer edge of the cam disc in the direction perpendicular to the axis of the cam disc.

In one refinement of the invention, the connecting segments of the cam disc each merge essentially tangentially with an adjacent step segment. As a result, jolt-like movements of the actuator during the activation of the actuating device can be avoided.

In a further refinement of the invention, the differences between axle spacings of adjacent step segments of the cam disc are each substantially the same. In this way, uniform actuating processes of the actuating device can be achieved. However, actuating devices with varying differences between axle spacings of adjacent step segments are basically also possible.

In a further refinement of the invention, the angular dimensions of the step segments of the cam disc are essentially the same. As a result, uniform actuating processes of the actuating device can be achieved. However, actuating devices with varying angular dimensions of the step segments are basically also possible.

In yet a further refinement of the invention, the angular dimensions of the connecting segments between the step segments of the cam disc are essentially the same. In this way, uniform actuating processes of the actuating device can be achieved. However, actuating devices with varying angular dimensions of the connecting segments are basically also possible.

The actuator can preferably be coupled via a roller to the cam disc, particularly preferably in the form of a deep groove ball bearing, wherein the axis of the roller extends essentially parallel to the axis of the cam disc and is attached to the actuator. This measure allows the frictional influences between the rotating cam disc and the linearly moved actuator to be minimized.

Furthermore, the actuator can, for example, be prestressed in the direction away from the cam disc, i.e. in the direction, for example, of the heating element valve, using a spring. In this way, the expenditure of energy for controlling the heating element valve which is prestressed against the actuator can be reduced.

In a further refinement of the invention, the rotation-linear conversion drive also has a step-down transmission which is coupled on the drive side to the motor shaft of the drive motor and on the output side to the cam disc.

In yet a further refinement of the invention, the actuating device can also have at least one solar cell for supplying energy to the drive motor, control electronics and/or a rechargeable energy store. In this way, the period of use (for example up to the replacement of a battery) of the actuating device can be significantly extended.

Other features which are considered as characteristic for the invention are set forth in the appended claims.

Although the invention is illustrated and described herein as embodied in an actuating device, in particular for a heating element valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Figure 1:
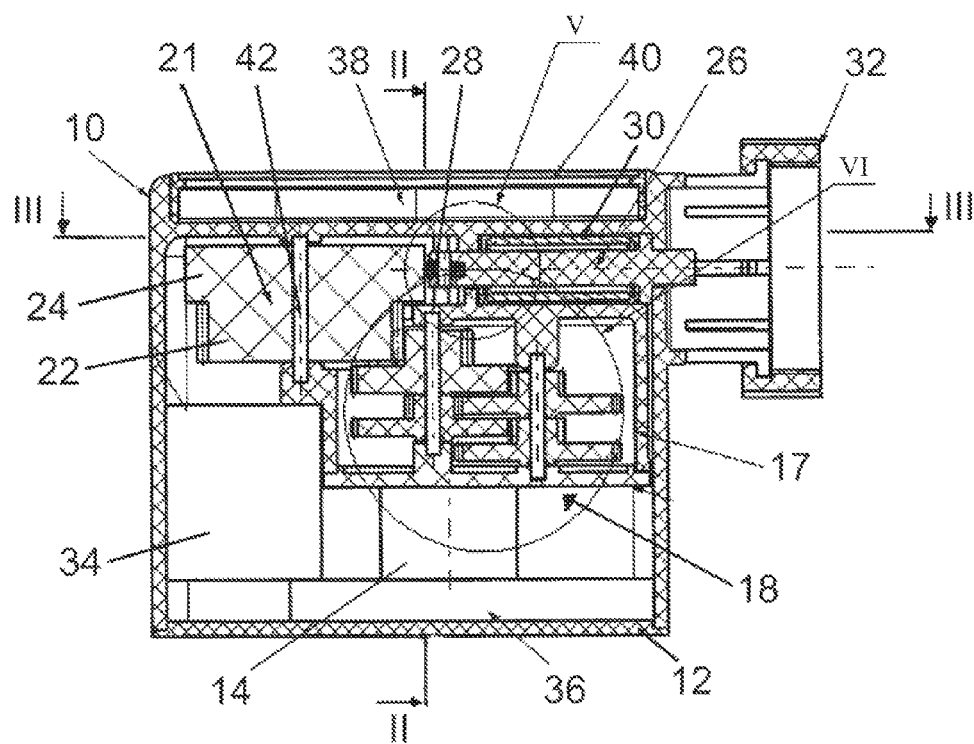
FIG. 1 shows a schematic segmental view of an actuating device according to an exemplary embodiment of the present invention, taken along the segment line I-I in FIGS. 2 and 3.
Figure 2:
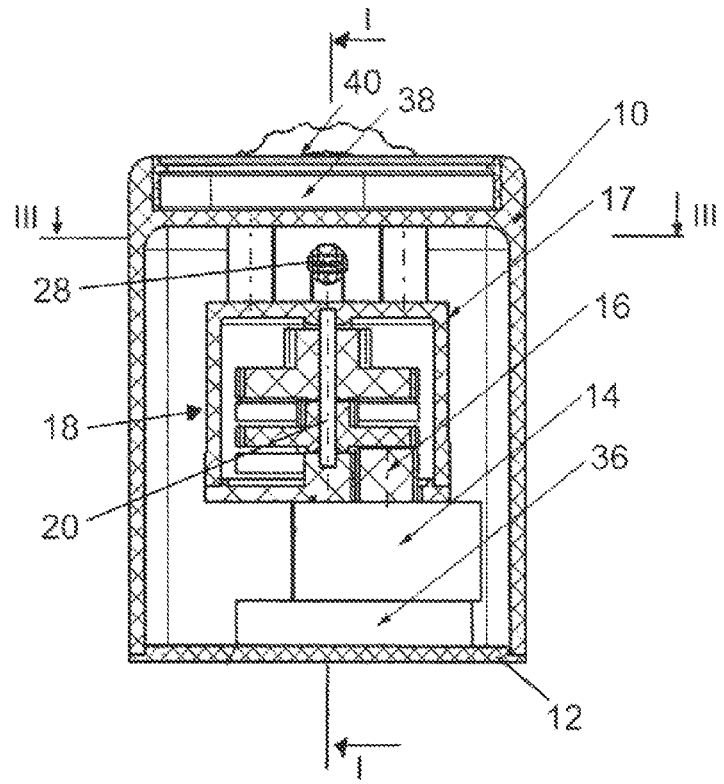
FIG. 2 shows a schematic segmental view of the actuating device of FIG. 1, taken along the segment line II-II in FIGS. 1 and 3.
Figure 3:
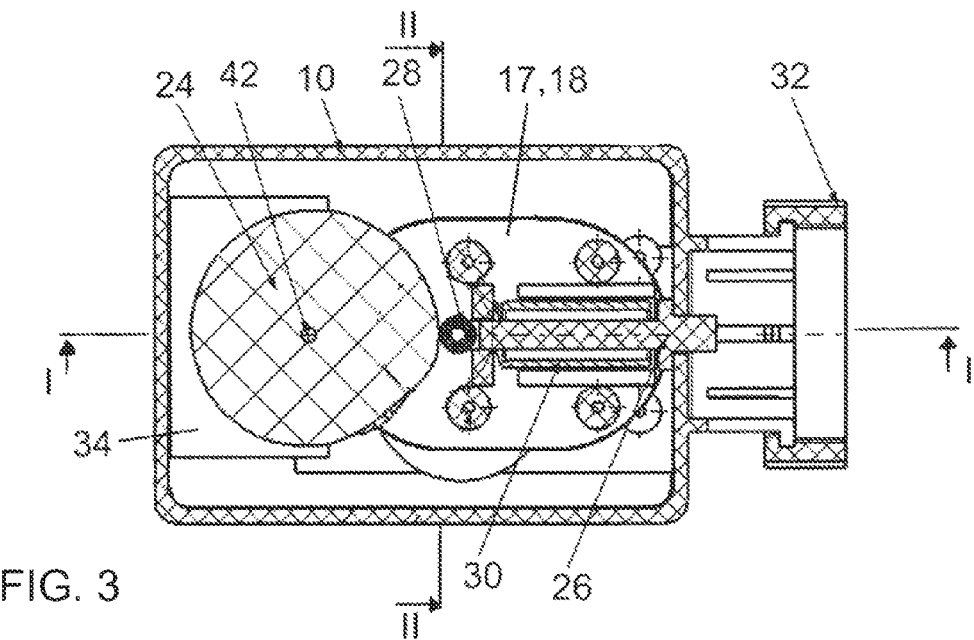
FIG. 3 shows a schematic segmental view of the actuating device in FIG. 1, taken along the segment line III-III in FIGS. 1 and 2.
Figure 4:
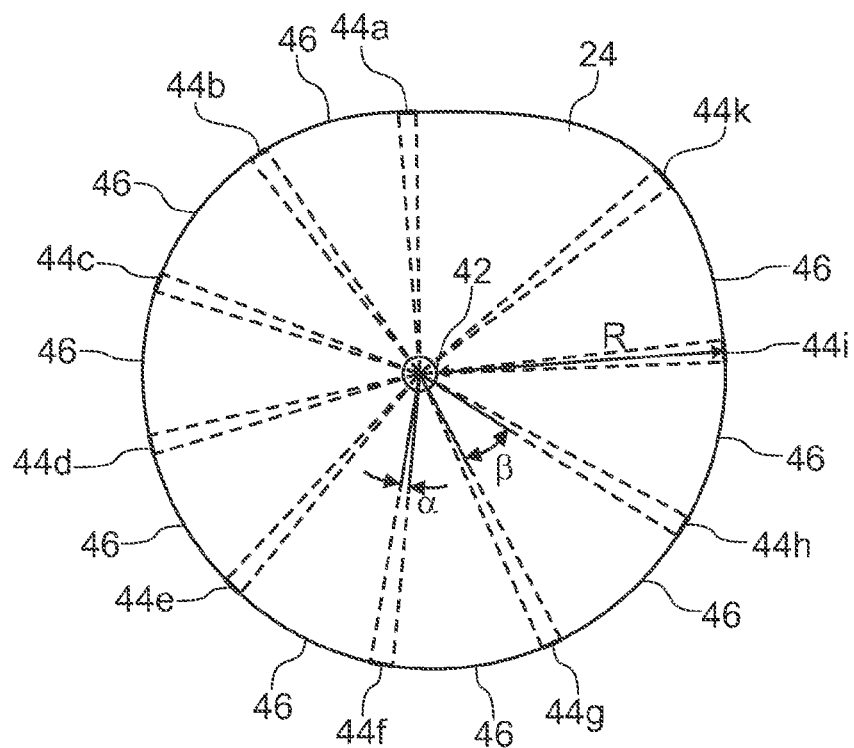
FIG. 4 shows a schematic plan view of a cam disc of the actuating device in FIGS. 1 to 3.
Figure 5:
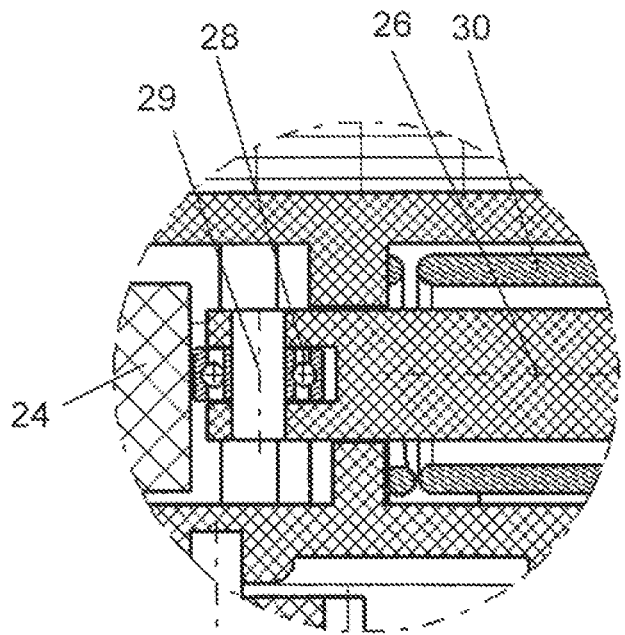
FIG. 5 shows a schematic view of the detail V in FIG. 1.
Figure 6:
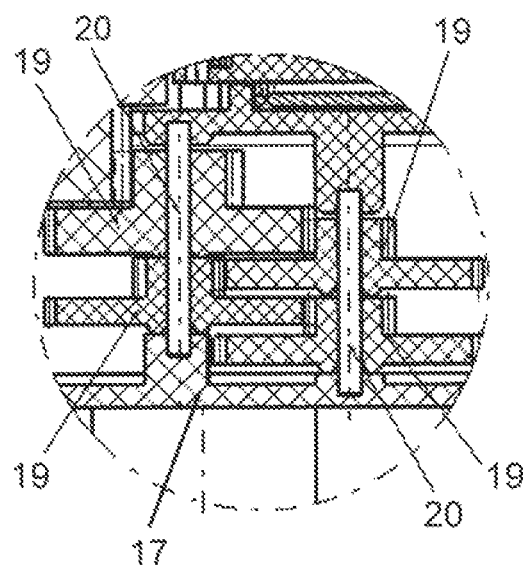
FIG. 6 shows a schematic view of the detail VI in FIG. 1.

Referring now to the figures of the drawing in detail and first, particularly, to FIGS. 1 to 3 thereof, there is shown the design of a currently preferred embodiment of an actuating device for a heating element valve in three different segmental views. Details of the exemplary actuating device are presented in FIGS. 4 to 6.

The actuating device comprises a housing 10 which can be enclosed with a housing lid 12 and is fabricated, for example, from polyamide (PA). A drive motor 14, for example a d.c. motor, with a motor shaft 16 is mounted in the housing 10.

A transmission housing 17 with a step-down transmission 18 therein is mounted above the drive motor 14 in FIGS. 1 and 2. The transmission housing 17 is also fabricated, for example, from PA. The step-down transmission 18 comprises a plurality of gear wheels 19 which are rotatably secured to shaft pins 20 and engage in one another. The drive-side gearwheel 19 of the step-down transmission 18 is in engagement here with the motor shaft 16. The gearwheels 19 are fabricated, for example, from polyformaldehyde (POM, polyoxymethylene), and the shaft pins 20 are composed, for example, of steel.

A conversion element 21, which is intended to convert the rotational movement of the motor shaft 16 of the drive motor 14 or of the gearwheels 19 of the step-down transmission 18 into a linear movement, is provided on the output side of the step-down transmission 18. For this purpose, the conversion element 21 is of essentially disc-shaped design and is composed, in the axial direction, of two disc-shaped segments 22, 24.

The drive segment 22 of the conversion element 21 has (at least to a certain extent) an outer toothing which is in engagement with the output-side gearwheel 19 of the step-down transmission 18. The cam disc 24 which is connected in a rotationally fixed fashion (preferably in an integrated fashion) to this drive segment 22 has a special outer periphery, which will be explained in more detail below with reference to FIGS. 4 and 4A.

Instead of the drive segment 22, the cam disc 24 can also be coupled on the drive side to the step-down transmission 18 via some other structure.

The cam disc 24 of the conversion element 21 is coupled on the output side to an actuator 26 in the form of a plunger which projects out of the housing 10. This plunger 26 is intended ultimately to act on the heating element valve (not illustrated) and therefore set the desired heating power.

In order to bring about a coupling between the cam disc 24 and the actuator 26 in a way which is as free of friction as possible, a roller 28 in the form of a deep groove ball bearing is provided. A deep groove ball bearing is configured to absorb predominantly radial forces, for which reason it can be used particularly advantageously at this location. The deep groove ball bearing 28 is mounted on a shaft 29 which is attached to that end of the actuator 26 which faces the cam disc 24. In this context, the shaft 29 for the deep groove ball bearing 28 is oriented essentially parallel to the axis 42 of the cam disc 24.

In addition, the actuator 26 is preferably prestressed in the direction of the heating element valve, i.e. counter to the valve spring thereof. For this purpose, a spring (compensation spring) 30 is used which is embodied as a helical spring and is arranged essentially coaxially with respect to the actuator 26. This spring 30 compensates part of the force caused by the valve spring of the heating element valve. The actuator 28 and the spring 30 are, for example, attached or mounted in a rotationally secured fashion to the transmission housing 17 or to the housing 10.

The cam disc 24 or the conversion element 21 and the actuator are fabricated, for example, from POM. The shaft pin 42 for the conversion element 21 is composed, for example, of steel.

In order to attach a heating element valve to this actuating device, for example a union nut 32 is provided on the housing 10. This union nut 32 and the indicated plug-in adaptor can easily be adapted to the respective heating element valve.

In addition, control electronics 34 for actuating the drive motor 14 and an energy store 36 in the form of at least one battery or one accumulator for supplying energy to the control electronics 34 and the drive motor 14 are provided in the housing 10 of the actuating device.

Furthermore, the housing 10 can be equipped with one or more solar cells 38 which are arranged behind a transparent disc 40. The at least one accumulator 36 can be charged using these solar cells 38, with the result that it is possible to dispense with the usual replacement of batteries.

The design and the method of functioning of the cam disc 24 will now be explained in more detail with reference to FIGS. 4 and 4A.

The cam disc 24 is rotatably mounted on an essentially central axis 42 which is attached to the transmission housing 17 of the step-down transmission 18 (cf. FIG. 1). It is not embodied in a rotationally symmetrical or circular fashion in a plan view, i.e. it is not embodied with a constant axle spacing R over its entire outer circumference but rather has an outer circumference with an axle spacing R which changes incrementally.

In particular, the cam disc 24 has, on its outer circumference, a plurality of step segments 44a, 44b, . . . 44k which are each at a substantially constant axle spacing R. The axle spacings R of the step segments 44a-k are, however, different from one another, in particular, the axle spacing R from the first step segment 44a to the last step segment 44k becomes continuously larger in most embodiments. In other words, the segments 44a-k are landings formed at a constant radius in themselves but at different radii relative to one another.

The step segments 44a-k are each connected to one another via connecting segments 46 which each have a variable axle spacing R, i.e. an axle spacing R which can vary in the circumferential direction of the cam disc 24.

The stepped outer contour of the cam disc 24, which is generated by means of the step segments 44a-k and connecting segments 46, brings about a correspondingly stepped linear movement of the actuator 26 by means of the roller 28 which rolls on the outer circumference of the cam disc 24.

In the preferred exemplary embodiment, the step segments 44a-k each have the same angular dimension α, and the connecting segments 46 also each have the same angular dimension β. In other words, the step segments are at the same angular distance from one another. Furthermore, the difference in the axle spacings R between two respective adjacent step segments 44a-k is essentially constant, i.e. there is an essentially uniform or constant step height. In this way, a particularly efficient switching process for setting the heating power by means of the heating element valve can be achieved. However, depending on the application, cam discs 24 with step segments 44a-k with different angular dimensions α, with connecting segments 46 with different angular dimensions 13 and/or with different step heights are also conceivable.

Figure 4A:
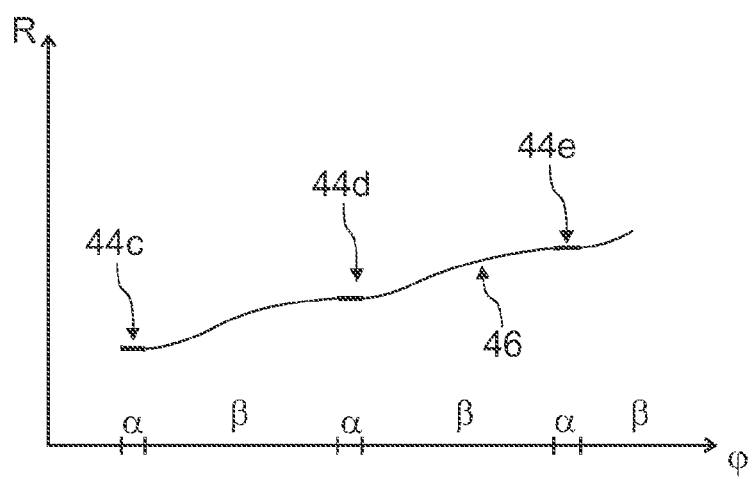
FIG. 4A shows a diagram explaining the step segments and connecting segments of the cam disc in FIG. 4.

As is apparent, in particular, in the illustration in FIG. 4A which is not true to scale, the connecting segments 46 preferably each merge tangentially with the two adjacent step segments 44. As a result, jolt-like or shock-like movements of the roller 28 and therefore of the actuator 26 during the rotation of the cam disc 24 are avoided.

Furthermore, FIG. 4A shows that the axle spacing R of a connecting segment 46 increases continuously in the direction from the adjacent step segment 44 with relatively small axle spacing R to the adjacent step segment 44 with relatively large axle spacing R (i.e. from left to right in FIG. 4A or in the clockwise direction in FIG. 4). In other words, the axle spacing R of a connecting segment 46 does not reach its maximum until at the tangential junction with the adjacent step segment 44 with the relatively large axle spacing R.

When the cam disc 24 rotates in the clockwise direction in FIG. 4, it is therefore necessary for a torque to be overcome in order to overcome a connecting segment 46. This means that the cam disc 24 on the step segments 44a-k has self-locking, with the result that in such a rotational position in which the roller 28 of the actuator 26 bears against a step segment 44a-k, it can be held without a further supply of energy (for example by the drive motor 14).

In one modified embodiment of the cam disc 24, the connecting segments 46 can, however, also have a maximum axle spacing R which is somewhat larger than the axle spacing of the adjacent step segment 44 with a relatively large axle spacing. In this case, a small torque must also be overcome in the other rotational direction of the cam disc 24 (i.e. in the anticlockwise direction in FIG. 4) in each case in order to overcome the connecting segment 46. Since the actuator 26 is prestressed in the direction of the heating element valve, i.e. away from the cam disc 24, this torque which is to be overcome should be significantly smaller than that in the other rotational direction.

The connecting segments 46 are advantageously constructed as what are referred to as splines, i.e. are composed of pieces of nth degree polynomials in the circumferential direction of the cam disc 24.

Furthermore, FIG. 4 shows an exemplary embodiment of a cam disc 24 with a total of ten step segments 44*a-k*. Of course, depending on the application and the desired number of setting possibilities, cam discs 24 with fewer than ten, if appropriate with just two or three step segments 44 or more than ten step segments 44, can also be used. In practice, cam discs 24 with five to twelve step segments 44 will most frequently be used.

Specific dimensioning of a cam disc 24 for the actuating device according to the invention will be explained in more detail below by way of example (without the intention of restricting the invention to the specified numerical values).

The cam disc 24 has, for example, a minimum axle spacing R of approximately 15 mm. In the case of ten step segments 44*a-k*, these generate a step height in the region of approximately 0.2 mm to approximately 0.5 mm, preferably in the range from approximately 0.25 mm to approximately 0.4 mm, for example approximately ⅓ mm (i.e. total actuation travel of approximately 3 mm in the case of ten steps). The angular dimension a of the step segments 44*a-k* is in each case approximately 2.5 degrees to 7 degrees, preferably approximately 3 degrees to approximately 5 degrees, for example approximately 4 degrees (4·π/180 rad). The angular dimension β of the connecting segments 46 is approximately 15 degrees to 50 degrees in each case here, preferably approximately 25 degrees to approximately 40 degrees, for example approximately 30 degrees (30·π/180 rad). In this example, for a customary actuating process of, for example, 2 mm it is necessary for the cam disc 24 to rotate through approximately 205 degrees.

If the inventive concept of the rotation-linear conversion drive with a self-locking cam disc is compared with that of the self-locking spindle drive, the cam disc has significant advantages, in particular in respect of the consumption of energy. In an actuating process, the energy consumption compared to an optimum threaded spindle can be reduced by over 20%.

With respect to the drive, it is possible, for example to use a DC motor 14 with a rotational speed of approximately 2000 rpm and a maximum torque of approximately 1.25 Nmm. A five-stage transmission with an overall step-down transmission ratio in the region of 300 is possible, for example, as the step-down transmission 18. The rotational speed of the cam disc 24 which is obtained is then, for example, approximately 5 rpm.

The invention claimed is:
1. An actuating device, comprising:
a drive motor with a motor shaft;
an actuator;
a rotation-linear conversion drive having a drive side coupled to said motor shaft and an output side coupled to said actuator and converting a rotational movement of said motor shaft into a linear movement of said actuator;
said output side of said rotation-linear conversion drive including a cam disc having an axis and an outer periphery formed with a plurality of step segments each having a respective constant spacing distance from said axis of said cam disc and with connecting segments therebetween having a variable spacing distance from said axis of said cam disc; and
a cam roller for rolling on said outer periphery of said cam disc.

2. The actuating device according to claim 1, configured for actuating a heating element valve.

3. The actuating device according to claim 1, wherein said connecting segments of said cam disc each merge substantially tangentially into a respectively adjacent said step segment.

4. The actuating device according to claim 1, wherein differences between each said spacing distance of adjacent step segments of said cam disc are substantially the same.

5. The actuating device according to claim 1, wherein an angular extent of each of said step segments of said cam disc are substantially equal.

6. The actuating device according to claim 1, wherein an angular extent of said connecting segments between said step segments of said cam disc are substantially equal.

7. The actuating device according to claim 1, wherein said actuator is prestressed in the direction away from said cam disc.

8. The actuating device according to claim 1, wherein said rotation-linear conversion drive further includes a step-down transmission having a drive side coupled to said motor shaft of said drive motor and an output side coupled to said cam disc.

9. The actuating device according to claim 1, which further comprises one or more of the following: at least one solar cell for supplying energy to said drive motor, control electronics, and a rechargeable energy storage device.

10. The actuating device according to claim 1, wherein said connecting segments together with said step segments define a locking mechanism for the actuating device.

11. An actuating device, comprising:
a drive motor with a motor shaft;
an actuator;
a rotation-linear conversion drive having a drive side coupled to said motor shaft and an output side coupled to said actuator and converting a rotational movement of said motor shaft into a linear movement of said actuator;
said output side of said rotation-linear conversion drive including a cam disc having an axis and an outer periphery formed with a plurality of step segments each having a constant spacing distance from said axis of said cam disc and with connecting segments therebetween having a variable spacing distance from said axis of said cam disc; and
a roller coupling said actuator to said cam disc, and wherein an axis of said roller extends substantially parallel to said axis of said cam disc and said roller is attached to said actuator.

12. The actuating device according to claim 11, wherein said roller is a deep groove ball bearing between said cam disc and said actuator.

13. An actuating device comprising:
a drive motor with a motor shaft;
an actuator; and
a rotation-linear conversion drive having a drive side coupled to said motor shaft and an output side coupled to said actuator and converting a rotational movement of said motor shaft into a linear movement of said actuator, said output side rotation-linear conversion drive including a cam disc having an axis and an outer periphery formed with a plurality of step segments each having a respective constant spacing distance from said axis of said cam disc, at least some of said step segments have a different said spacing distance relative to one another, and connecting segments between said step segments, said connecting segments having a variable spacing distance from said axis of said cam disc.

* * * * *